US009367687B1

(12) United States Patent
Warshenbrot

(10) Patent No.: US 9,367,687 B1
(45) Date of Patent: Jun. 14, 2016

(54) METHOD FOR MALWARE DETECTION USING DEEP INSPECTION AND DATA DISCOVERY AGENTS

(75) Inventor: Or Tzvi Warshenbrot, Apex, NC (US)

(73) Assignee: EMC Corporation, Hopkinton, MA (US)

(*) Notice: Subject to any disclaimer, the term of this patent is extended or adjusted under 35 U.S.C. 154(b) by 1086 days.

(21) Appl. No.: 13/335,252

(22) Filed: Dec. 22, 2011

(51) Int. Cl.
G06F 21/56 (2013.01)

(52) U.S. Cl.
CPC .................................. *G06F 21/566* (2013.01)

(58) Field of Classification Search
CPC combination set(s) only.
See application file for complete search history.

(56) References Cited

U.S. PATENT DOCUMENTS

| 6,330,547 | B1* | 12/2001 | Martin | G06Q 40/025 |
| | | | | 705/38 |
| 7,694,150 | B1* | 4/2010 | Kirby | 713/188 |
| 8,307,443 | B2* | 11/2012 | Wang | G06F 21/53 |
| | | | | 713/187 |
| 8,381,298 | B2* | 2/2013 | Blumfield | G06F 21/564 |
| | | | | 726/22 |
| 8,429,746 | B2* | 4/2013 | Capalik | H04L 63/1491 |
| | | | | 380/201 |
| 8,499,350 | B1* | 7/2013 | Satish | G06F 21/566 |
| | | | | 726/23 |
| 8,516,590 | B1* | 8/2013 | Ranadive et al. | 726/24 |
| 8,555,388 | B1* | 10/2013 | Wang | H04L 63/1416 |
| | | | | 709/245 |
| 8,566,932 | B1* | 10/2013 | Hotta | G06F 11/00 |
| | | | | 726/2 |
| 8,990,939 | B2* | 3/2015 | Staniford | H04L 63/1416 |
| | | | | 713/187 |
| 9,237,164 | B2* | 1/2016 | Harlacher | H04L 63/1425 |
| 2004/0236960 | A1* | 11/2004 | Zimmer et al. | 713/200 |
| 2008/0098207 | A1* | 4/2008 | Reid | G06F 11/3636 |
| | | | | 712/227 |
| 2011/0106736 | A1* | 5/2011 | Aharonson | G06F 10/109 |
| | | | | 706/12 |
| 2011/0307957 | A1* | 12/2011 | Barcelo | G06F 21/552 |
| | | | | 726/25 |
| 2012/0017275 | A1* | 1/2012 | Harmonen | 726/24 |
| 2012/0304244 | A1* | 11/2012 | Xie | G06F 21/00 |
| | | | | 726/1 |
| 2012/0331553 | A1* | 12/2012 | Aziz et al. | 726/23 |
| 2014/0123279 | A1* | 5/2014 | Bishop | G06F 21/566 |
| | | | | 726/23 |
| 2014/0289853 | A1* | 9/2014 | Teddy | H04L 63/1416 |
| | | | | 726/23 |

OTHER PUBLICATIONS

"NetWitness Spectrum™," NetWitness Corporation, retrieved from http://web.archive.org/web/20110716224130/http://netwitness.com/sites/default/files/uploads/documents/NetWitness_Spectrum.pdf, Jul. 16, 2011, retrieved on Jun. 12, 2013.
"NextGen™ Infrastructure," NetWitness Corporation, retrieved from http://web.archive.org/web/20111006102906/http://netwitness.com/sites/default/files/uploads/documents/NetWitness_NextGen_Overview.pdf, Jul. 16, 2011, retrieved on Jun. 12, 2013.
RSA. Oct. 11, 2011. "RSA Accelerates Identification of Zero Day Malware, Expands Community of Threat Intelligence Sources [Press release]." Retrieved from http://www.emc.com/about/news/press/2011/20111011-02.htm.
Dotan et al., "Managing Access to a Limited Number of Computerized Sessions," U.S. Appl. No. 13/337,442, filed Dec. 27, 2011.
Vaystikh et al., "Malware Detection Using Risk Analysis Based on File System and Network Activity," U.S. Appl. No. 12/981,072, filed Dec. 29, 2010.

\* cited by examiner

*Primary Examiner* — Taghi Arani
*Assistant Examiner* — Phy Anh Vu
(74) *Attorney, Agent, or Firm* — BainwoodHuang

(57) ABSTRACT

A method of detecting malware is provided. The method includes (a) from a database of historic network traffic, identifying a suspect file that traveled through a network as being suspected malware, (b) deriving a distinctive signature based on contents of the suspect file, and (c) scanning a computerized device of the network for the distinctive signature to detect whether the suspect file is present on the computerized device. Embodiments directed to analogous computer program products and apparatuses are also provided.

18 Claims, 6 Drawing Sheets

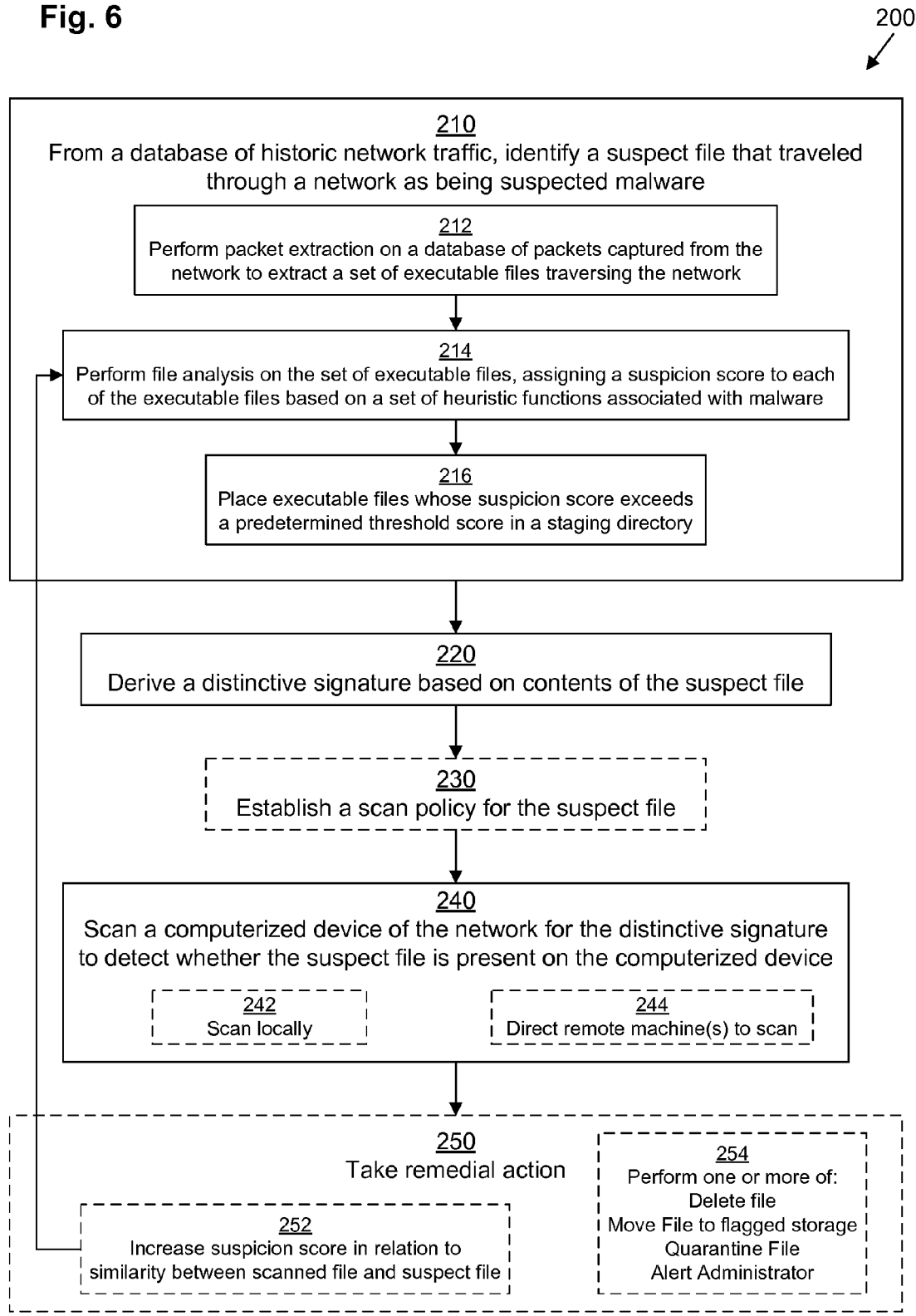

METHOD FOR MALWARE DETECTION USING DEEP INSPECTION AND DATA DISCOVERY AGENTS

BACKGROUND

Malware is malicious software which is designed to disrupt normal operation of a computer system, illicitly gather data, gain unauthorized access to a system, destroy data, or perform other malicious actions. In order to prevent malware attacks, conventional systems rely on anti-virus software to detect and destroy malware either as it is being installed to a system or upon periodic system scans.

Conventional anti-virus software operates on individual computers and relies on databases of signatures associated with known malware in order to identify malware on that individual computer. Much such conventional anti-virus software is vulnerable to zero-day attacks, in which new malware, whose signatures were not previously included with the signature database, attacks the computer. Certain more advanced conventional anti-virus software is able to detect some zero-day attacks by also relying on code analysis in order to search files not identified by signature detection for characteristics often associated with malware.

SUMMARY

Unfortunately, the above-described conventional anti-virus software suffers from several deficiencies. In particular, the code analysis performed by advanced conventional malware may not be advanced enough to detect all zero-day attacks. Even more advanced products able to detect a large fraction of zero-day attacks typically require so many computational resources that it is infeasible to operate them on individual systems on a regular basis. In some large networks, it would be possible to operate these more advanced products in powerful servers that can analyze network traffic for zero-day malware, but even such an implementation would not detect the zero-day malware already installed on individual network machines from sources other than the network or prior to identification.

It would be desirable to implement a system capable of applying advanced computationally-complex algorithms to detect malware traversing a network that is also configured to eliminate all such malware even from network machines on which it was previously installed.

In contrast to the above-described conventional approaches, the present disclosure is directed to techniques for analyzing network traffic to detect suspected malware, such as zero-day malware, traversing the network and then automatically also detecting similar suspected malware already installed on computing devices of the network.

In one embodiment, a method of detecting malware is provided. The method includes (a) from a database of historic network traffic, identifying a suspect file that traveled through a network as being suspected malware, (b) deriving a distinctive signature based on contents of the suspect file, and (c) scanning a computerized device of the network for the distinctive signature to detect whether the suspect file is present on the computerized device. Embodiments directed to analogous computer program products and apparatuses are also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 6 illustrates an example method according to various embodiments.

DETAILED DESCRIPTION

Techniques are provided herein for analyzing network traffic to detect suspected malware, such as zero-day malware, traversing a network and then automatically also detecting similar suspected malware already installed on computing devices of the network.

Figure 1:
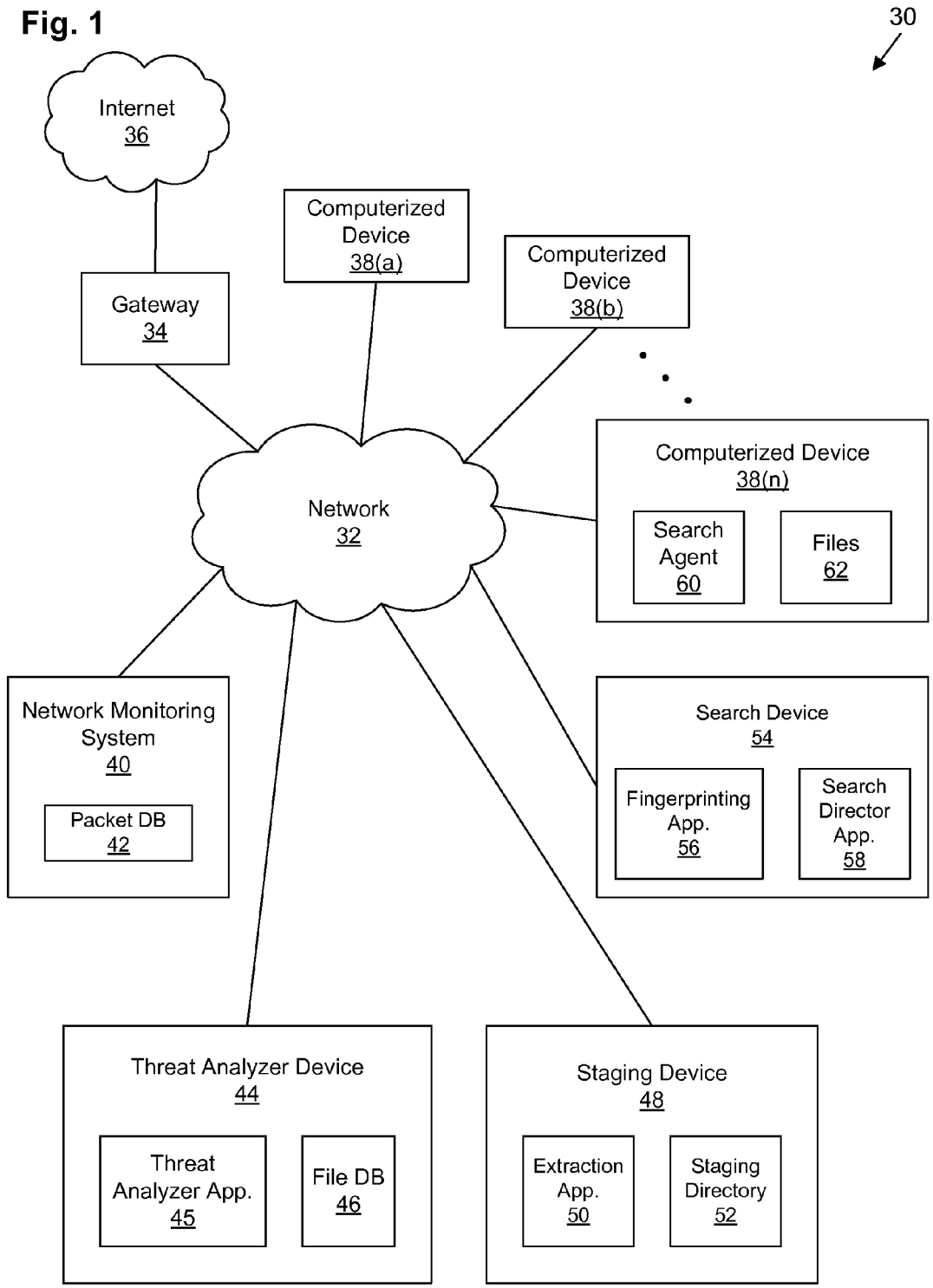
FIG. 1 illustrates an example system for use in connection with various embodiments.

FIG. 1 depicts a system 30 for use in connection with various embodiments. System 30 includes a network 32. Network 32 may be, for example, a wide area network (WAN), a local area network (LAN), a set of point-to-point connections, a virtual private network (VPN), etc. In one embodiment, network 32 is a LAN which connects to Internet 36 via a gateway 34. In another embodiment, network 32 may be a collection of LANs which connect to each other across Internet 36, each of the LANs having a separate gateway 34. Other more complex arrangements are also envisioned. Network 32 includes a plurality of computerized devices 38 which are configured to communicate with each other across network 38. Computerized devices 38 may also be configured to communicate with the Internet 36 via network 32 and gateway 34.

Computerized devices 38 may be any kind of computing device, such as, for example, a personal computer, a desktop computer, a workstation computer, a server computer, an enterprise server computer, a laptop computer, a mobile computer, a portable computing device, a tablet computing device, a smart phone, etc. An example computerized device 38 is depicted in further detail below, in connection with FIG. 5.

Network 32 also attaches to a network monitoring system 40. Network monitoring system 40 is a full-packet capture system configured to capture packets traversing the network 32 into one or more packet databases (DBs) 42. Network monitoring system 40 may be, for example, configured to operate according to the RSA Netwitness® NextGen™ platform provided by the EMC Corp. of Hopkinton, Mass.

In one embodiment, network monitoring system 40 includes a single computerized device, such as a server computer, configured to capture all packets exchanged across network 32 into a single packet DB 42. An example single-machine network monitoring system 40 is the RSA Netwitness® NWA55 "Eagle" appliance produced by the EMC Corp.

In other embodiments network monitoring system 40 includes a plurality of computerized devices, such as server computers, configured to capture all packets exchanged across network 32 into a distributed packet DB 42. For example, a plurality of RSA Netwitness® Decoder appliances, produced by the EMC Corp., may each be connected to different portions of network 32, each Decoder appliance configured to capture all packets exchanged across its assigned portion of network 32. One or more RSA Netwitness® Concentrator appliances, produced by the EMC Corp., may aggregate the captured packets from the various Decoder appliances into distributed packet DBs 42, and an RSA Netwitness® Broker appliance, produced by the EMC Corp., may logically facilitate queries to the various distributed packet DBs 42.

Network 32 also attaches to a threat analyzer device 44. Threat analyzer device 44 may be a server computer configured to run a threat analyzer application 45, which analyzes the packet DB 42 and produces a file DB 46, which stores files and associated threat scores based on the information in the packet DB 42. Threat analyzer device 44 may be, for example, an RSA Netwitness® Spectrum appliance provided, by the EMC Corp. An example threat analyzer device 44 is depicted in further detail below, in connection with FIG. 2.

Network 32 also attaches to a staging device 48. Staging device 48 may be a server computer configured to run an extraction application 50, which extracts relevant files from file DB 46 and stores them in a staging directory 52. An example staging device 48 is depicted in further detail below, in connection with FIG. 3.

Network 32 also attaches to a search device 54. Search device 54 may be a server computer configured to run a fingerprinting application 56 and a search director application 58. Fingerprinting application 56 is configured to calculate a fingerprint of each of the files in staging directory 52, and search director application 58 is configured to communicate with search agents 60 running on the computerized devices 38 to manage a search for files 62 having matching fingerprints. Fingerprinting application 56 and search director application 58 may be, for example, applications within an RSA Data Loss Prevention (DLP) suite of products provided, by the EMC Corp., such as the DLP Datacenter system or the DLP Endpoint system. An example search device 54 is depicted in further detail below, in connection with FIG. 4.

It should be understood that although components 38, 40, 44, 48, and 54 have been described and depicted as separate hardware, in some embodiments, the functionalities of these systems may all be combined into a single device or distributed among a plurality of devices in a different manner. For example, the functionality of network monitoring system 40 and threat analyzer device 44 may be combined into a single device. As an additional example the functionality of staging device 48 and threat analyzer device 44 may be combined into a single device. As an additional example the functionality of search device 54 may be combined into one or more of the computerized devices 38.

Figure 2:
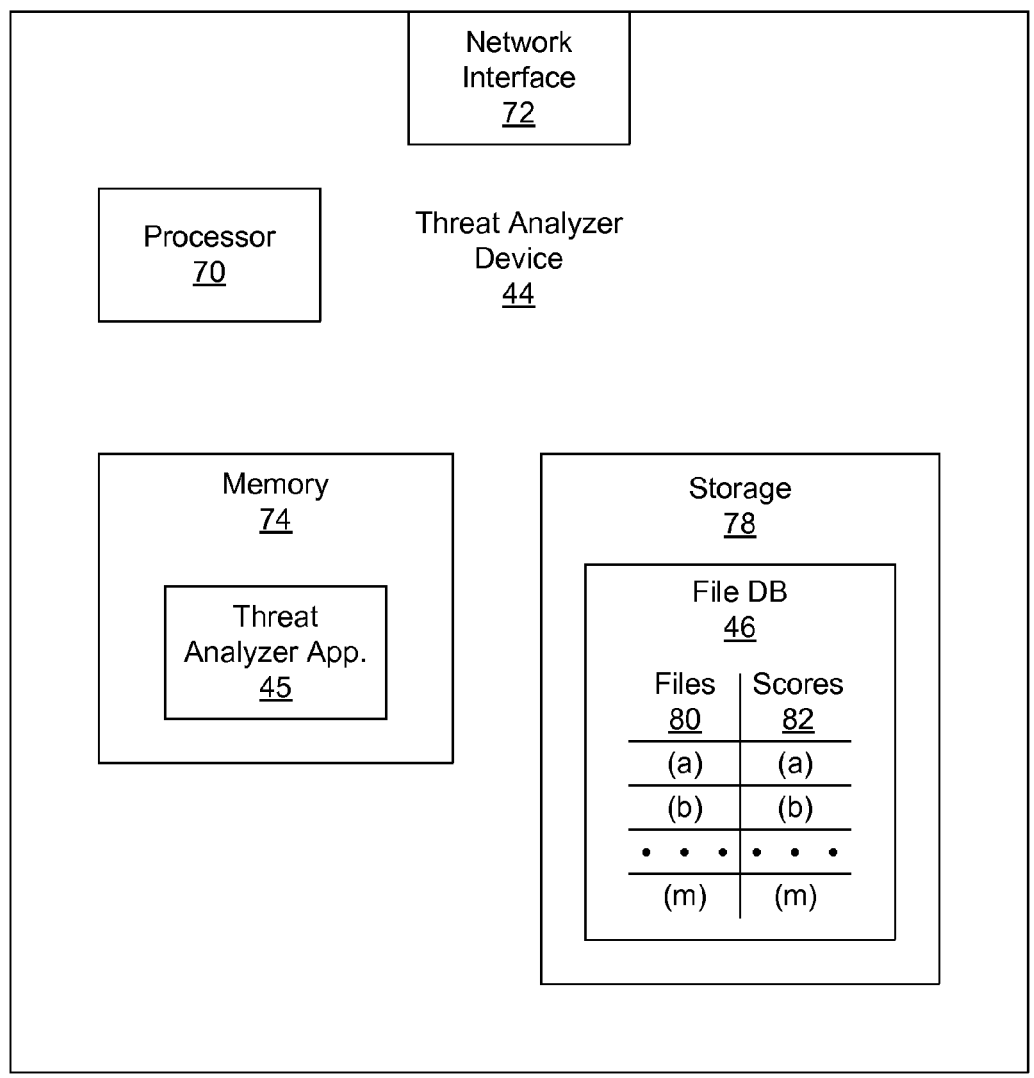
FIG. 2 illustrates an example apparatus for use in connection with various embodiments.

FIG. 2 depicts an example threat analyzer device 44 of various embodiments in more detail. Threat analyzer device 44 may be any kind of computing device, such as, for example, a personal computer, a desktop computer, a workstation computer, a server computer, an enterprise server computer, a laptop computer, etc. Threat analyzer device 44 includes a processor 70. Processor 70 may be, for example, a central processing unit, a microprocessor, a collection of multiple microprocessors, a digital signal processor, a field-programmable gate array, a collection of circuits configured to perform various operations, or another similar device or set of devices configured to perform operations. Threat analyzer device 44 also includes a network interface 72 for connecting to network 32.

Threat analyzer device 44 also includes storage 78 and memory 74. Storage 78 is a form of non-volatile memory for storing files and data. Storage 78 may include, for example, a hard disk drive, a floppy diskette drive, a CD-ROM drive, a DVD drive, a Blu-ray drive, a solid-state disk drive, magnetic storage, optical storage, flash memory, some combination thereof, or another similar device or set of devices configured to store application programs and or application data. Memory 74 may include, for example, system memory, cache memory, volatile memory, random access memory, some combination thereof, or another similar device or set of devices configured to store running software and or data.

It should be understood that, within this Description, any time a piece of software is described as executing, running, operating, or performing a method, function, step, operation, etc., the method, function, step, or operation is actually performed by a processor while executing code of the software stored in memory.

Memory 74 stores threat analyzer application 45 while running on processor 70, as well as other executing and loaded code such as the operating system, drivers, and other applications and data (not depicted). In operation, threat analyzer application 45 periodically queries the packet DB 42 for packets stored therein that have traversed the network 32, and threat analyzer application 45 extracts files encoded within one or more such packets. Threat analyzer application 45 is then able to store all files 80 of relevant types (e.g., executable programs configured to operate on the Windows operating system, produced by Microsoft Corp. of Redmond, Wash.) within file DB 46 stored within storage 78. Threat analyzer application 45 is also able to perform deep inspection of these relevant files in order to generate a threat score 82 associated with each relevant file, the threat score indicating how likely each relevant file is to be malware that can harm systems on the network 3. Details with respect to the operation of threat analyzer application 45 will be described in further detail below, in connection with FIG. 6.

Storage 78 may also store additional components (not depicted), such as an operating system, various libraries, other application programs, application data, user data, etc.

Storage 78 may include a computer program product. The computer program product stores a computer program within a tangible non-transitory computer-readable storage medium. The computer program, when executed by processor 70 (and stored in memory 74 as threat analyzer application 45), is configured to cause the processor 70 to perform a method (see FIG. 6, below, particularly sub-steps 212-214) according to various embodiments.

Figure 3:
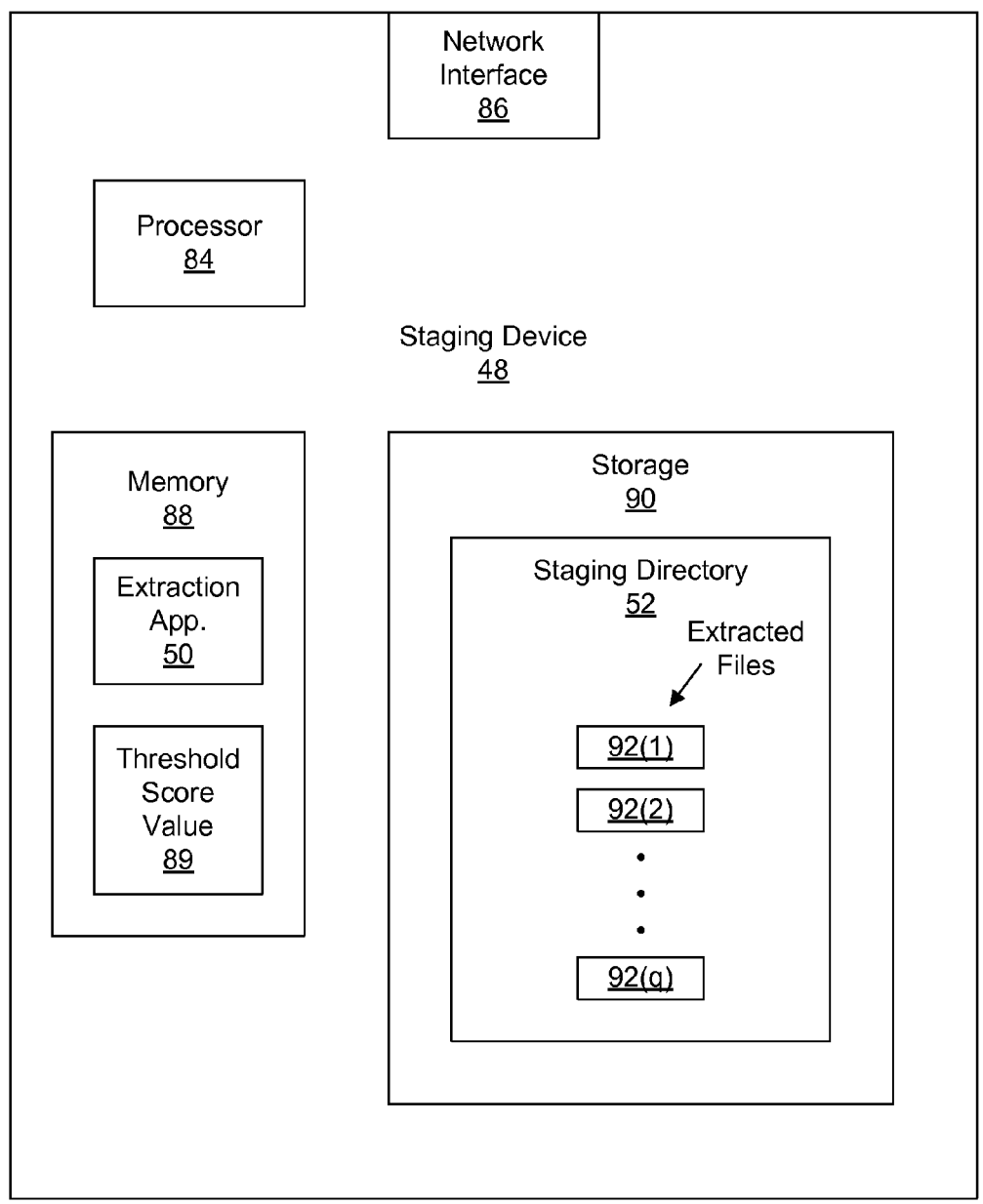
FIG. 3 illustrates an example apparatus for use in connection with various embodiments.

FIG. 3 depicts an example staging device 48 of various embodiments in more detail. Staging device 48 may be any kind of computing device, such as, for example, a personal computer, a desktop computer, a workstation computer, a server computer, an enterprise server computer, a laptop computer, etc. Staging device 48 includes a processor 84. Processor 84 may be, for example, a central processing unit, a microprocessor, a collection of multiple microprocessors, a digital signal processor, a field-programmable gate array, a collection of circuits configured to perform various operations, or another similar device or set of devices configured to perform operations. Staging device 48 also includes a network interface 86 for connecting to network 32.

Staging device 48 also includes storage 90 and memory 88. Storage 90 is a form of non-volatile memory for storing files and data. Storage 90 may include, for example, a hard disk drive, a floppy diskette drive, a CD-ROM drive, a DVD drive, a Blu-ray drive, a solid-state disk drive, magnetic storage, optical storage, flash memory, some combination thereof, or another similar device or set of devices configured to store application programs and or application data. Memory 88 may include, for example, system memory, cache memory, volatile memory, random access memory, some combination thereof, or another similar device or set of devices configured to store running software and or data.

Memory 88 stores extraction application 50 while running on processor 84, as well as other executing and loaded code such as the operating system, drivers, and other applications and data (not depicted). Memory 88 also stores a threshold score value 89. In operation, extraction application 50 periodically queries the file DB 46 for relevant files 80 stored therein together with their associated threat scores 82, and, extraction application 50 stores relevant files 80 having an associated threat score 82 that exceeds threshold score value 89 as extracted files 92 within staging directory on storage 90. Details with respect to the operation of extraction application 50 will be described in further detail below, in connection with FIG. 6.

Storage 90 may also store additional components (not depicted), such as an operating system, various libraries, other application programs, application data, user data, etc.

Storage 90 may include a computer program product. The computer program product stores a computer program within a tangible non-transitory computer-readable storage medium. The computer program, when executed by processor 84 (and stored in memory 88 as staging application 50), is configured to cause the processor 84 to perform a method (see FIG. 6, below, particularly sub-step 216) according to various embodiments.

Figure 4:
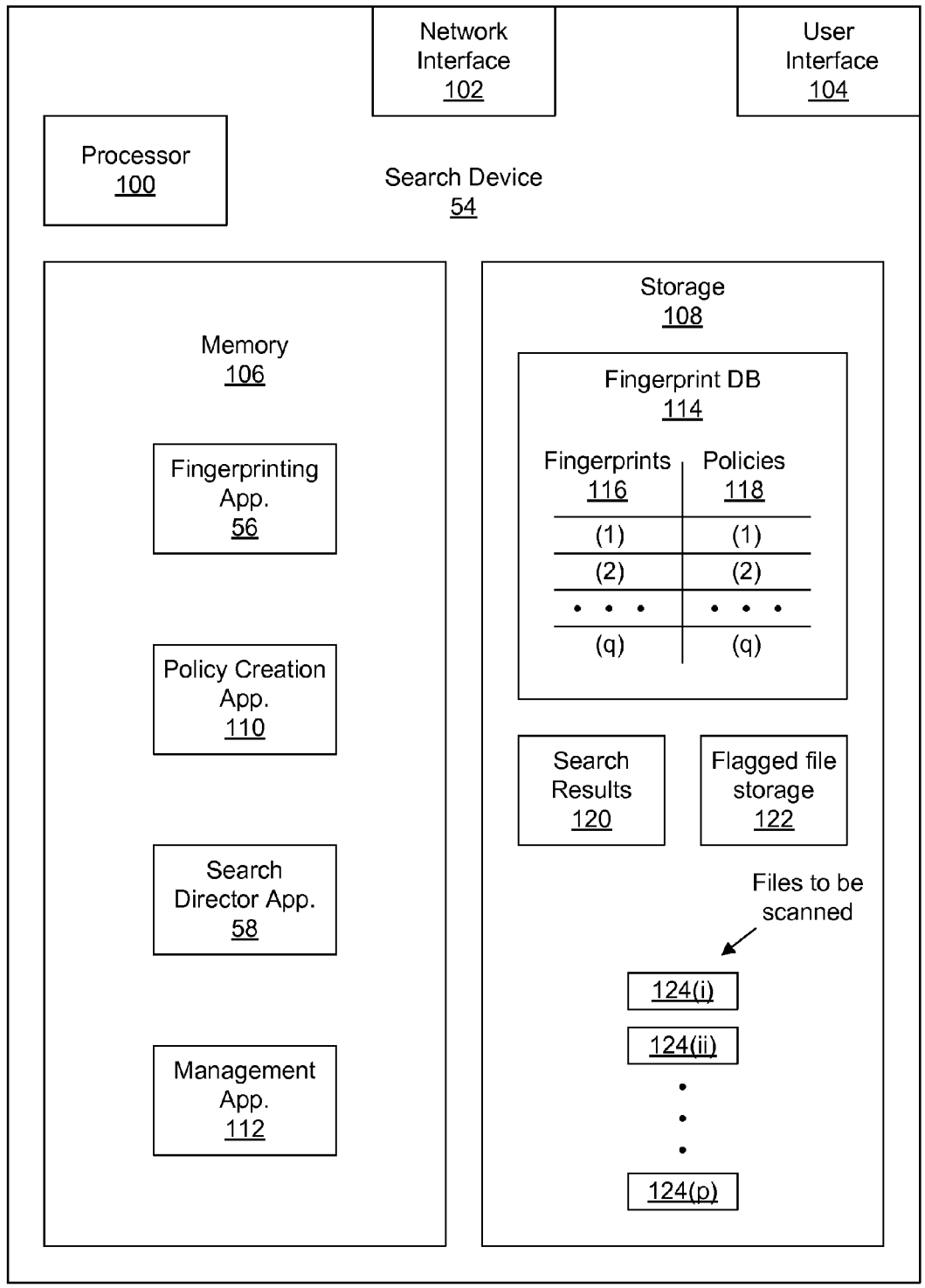
FIG. 4 illustrates an example apparatus for use in connection with various embodiments.

FIG. 4 depicts an example search device 54 of various embodiments in more detail. Search device 54 may be any kind of computing device, such as, for example, a personal computer, a desktop computer, a workstation computer, a server computer, an enterprise server computer, a laptop computer, etc. Search device 54 includes a processor 100. Processor 100 may be, for example, a central processing unit, a microprocessor, a collection of multiple microprocessors, a digital signal processor, a field-programmable gate array, a collection of circuits configured to perform various operations, or another similar device or set of devices configured to perform operations. Search device 54 also includes a network interface 102 for connecting to network 32 and a user interface (UI) 104 for connecting to one or more UI devices. UI devices may include, for example, a display monitor, a touch-sensitive display device, a keyboard, a keypad, a mouse, a tracking pad, a tracking ball, a printer, a speaker, etc.

Search device 54 also includes storage 108 and memory 106. Storage 108 is a form of non-volatile memory for storing files and data. Storage 108 may include, for example, a hard disk drive, a floppy diskette drive, a CD-ROM drive, a DVD drive, a Blu-ray drive, a solid-state disk drive, magnetic storage, optical storage, flash memory, some combination thereof, or another similar device or set of devices configured to store application programs and or application data. Memory 106 may include, for example, system memory, cache memory, volatile memory, random access memory, some combination thereof, or another similar device or set of devices configured to store running software and or data.

Memory 106 stores fingerprinting application 56 and search director application 58, while running on processor 100. In some embodiments, memory 106 also stores policy creation application 110 and management application 112, while running on processor 100. Memory 106 also stores other executing and loaded code such as the operating system, drivers, and other applications and data (not depicted).

In operation, fingerprinting application 56 applies a hashing algorithm to extracted files 92 on the staging device 48, and stores resulting fingerprints 116 within a fingerprint DB 114 on storage 108. In some embodiments, policy creation application 110 assigns a set of policies 118 to the various fingerprints 116 and also stores the policies 118 within fingerprint DB 114. Search director application 58 manages search agents 60 on the various computerized devices 38 to each search for files having fingerprints matching the fingerprints 116 in the fingerprint DB 114. In some embodiments, search director application 58 also locally searches local files 124 on storage 108 for the fingerprints 116. In some embodiments, search director application 58 also passes policies 118 to the search agents 60 to provide granular control over how the search agents 60 perform searches for different fingerprints 116. Search director application 58 receives search results 120 from the various search agents 60. In some embodiments, management application 112 processes the search results 120, possibly displaying results to a user over the UI 104 or taking other actions, like quarantining matching files or moving them to a secure flagged file storage area 122. Details with respect to the operation of fingerprinting application 56, search director application 58, policy creation application 110, and management application 112 will be described in further detail below, in connection with FIG. 6.

Storage 108 may also store additional components (not depicted), such as an operating system, various libraries, other application programs, application data, user data, etc.

Storage 108 may include several computer program products. Each computer program product stores a computer program within a tangible non-transitory computer-readable storage medium. One computer program, when executed by processor 100 and stored in memory 106 as fingerprinting application 56, is configured to cause the processor 100 to perform a method (see FIG. 6, below, particularly step 220) according to various embodiments. Another computer program, when executed by processor 100 and stored in memory 106 as policy creation application 110, is configured to cause the processor 100 to perform a method (see FIG. 6, below, particularly step 230) according to various embodiments. Another computer program, when executed by processor 100 and stored in memory 106 as search director application 58, is configured to cause the processor 100 to perform a method (see FIG. 6, below, particularly step 240) according to various embodiments. Another computer program, when executed by processor 100 and stored in memory 106 as management application 112, is configured to cause the processor 100 to perform a method (see FIG. 6, below, particularly step 250) according to various embodiments.

Figure 5:
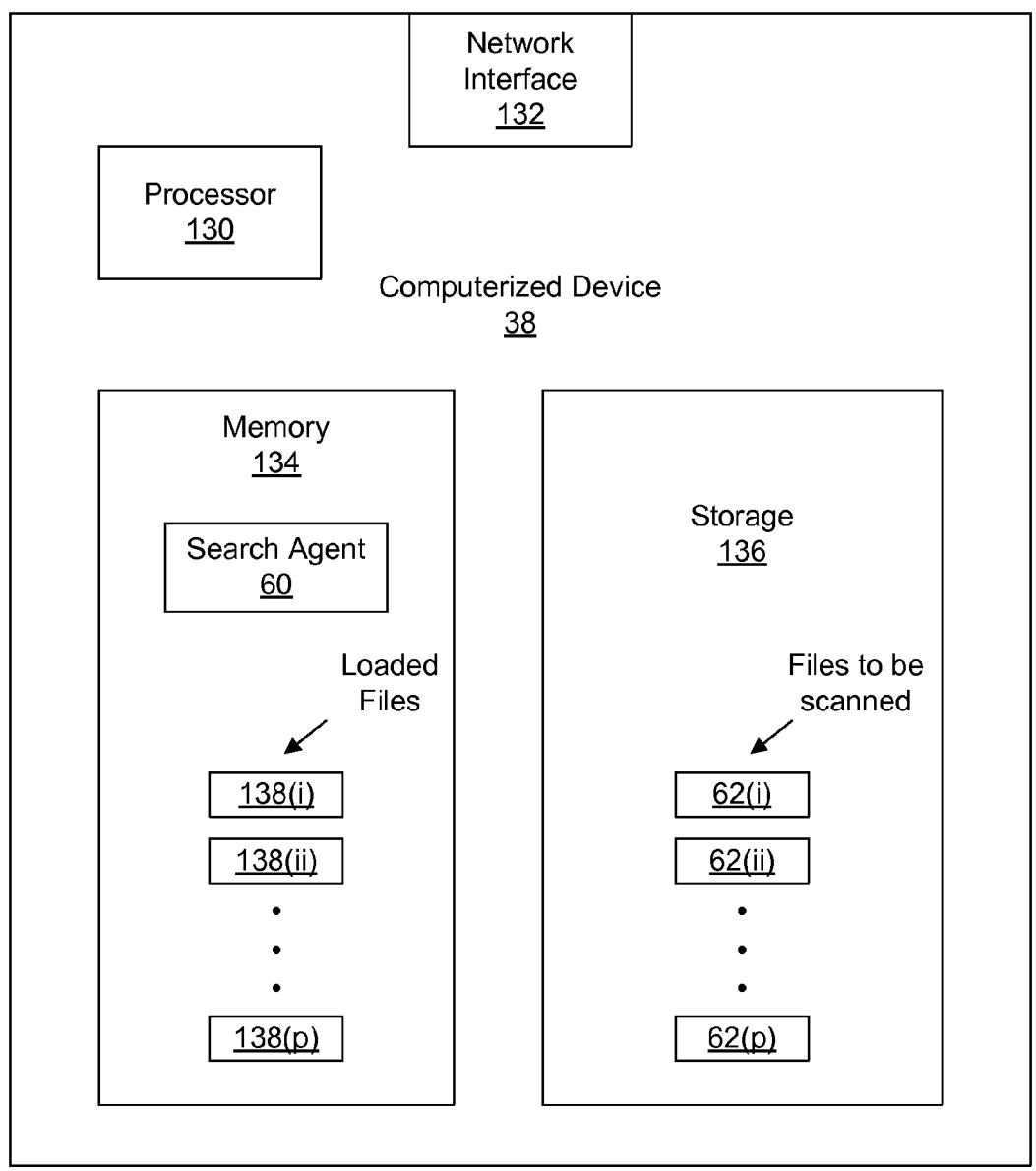
FIG. 5 illustrates an example apparatus for use in connection with various embodiments.

FIG. 5 depicts an example computing device 38 of various embodiments in more detail. Computing device 38 may be any kind of computing device, such as, for example, a personal computer, a desktop computer, a workstation computer, a server computer, an enterprise server computer, a laptop computer, a mobile telecommunications device, etc. Computing device 38 includes a processor 130. Processor 130 may be, for example, a central processing unit, a microprocessor, a collection of multiple microprocessors, a digital signal processor, a field-programmable gate array, a collection of circuits configured to perform various operations, or another similar device or set of devices configured to perform operations. Computing device 38 also includes a network interface 132 for connecting to network 32.

Computing device 38 also includes storage 136 and memory 134. Storage 136 is a form of non-volatile memory for storing files and data. Storage 136 may include, for example, a hard disk drive, a floppy diskette drive, a CD- ROM drive, a DVD drive, a Blu-ray drive, a solid-state disk drive, magnetic storage, optical storage, flash memory, some combination thereof, or another similar device or set of devices configured to store application programs and or application data. Memory 134 may include, for example, system memory, cache memory, volatile memory, random access memory, some combination thereof, or another similar device or set of devices configured to store running software and or data.

Memory 134 stores search agent 60 while running on processor 130, as well as other executing and loaded code such as the operating system, drivers, and other applications and data (not depicted). This other loaded code may include loaded files 138.

Storage 136 stores a collection of files 62, which are to be scanned by search agent 60 to ensure that they do not contain malware. Files 62 may include additional components (not depicted), such as an operating system, various libraries, other application programs, application data, user data, etc. stored in storage 136.

In operation, search agent 60 receives instructions from search director application 58. In some embodiments, search director application 58 then performs a search on files 62 stored in storage 136 for files which have fingerprints matching fingerprints 116 from the fingerprint DB 114. This search may be performed on a scheduled periodic basis. Search agent 60 then sends the matching files (or, in some embodiments, metadata about each of the matching files) back to search director application 58.

In other embodiments, instead of performing the search on files 62 stored in storage 136, search agent 60 is a background task which searches loaded files 138 as they are loaded into memory 134. In other embodiments, search agent 60 both periodically searches files 62 in storage 135 and background searches loaded files 138 as they are loaded.

Storage 136 may include a computer program product. The computer program product stores a computer program within a tangible non-transitory computer-readable storage medium. The computer program, when executed by processor 130 (and stored in memory 134 as search agent 60), is configured to cause the processor 130 to perform a method (see FIG. 6, below, particularly sub-step 242) according to various embodiments.

FIG. 6 depicts an example method 200 according to various embodiments. Method 200 may be performed by system 30, various steps and sub-steps individually being performed by various specific components of system 30.

In step 210, from a database of historic network traffic (e.g., packet DB 42) system 30 identifies a suspect file that traveled through network 32 as being suspected malware. Step 210 is typically performed in three constituent sub-steps, sub-steps 212, 214, and 216.

In sub-step 212, threat analyzer application 45 (e.g., running on threat analyzer device 44) performs packet extraction on the packet DB 42 to extract a set of executable files 80 which traversed the network 32. In some embodiments, this extraction is limited to executable files which could be executed by systems of interest, such as, for example, Windows executable files or Linux executable file. This extraction may be performed by parsing the packets in packet DB into a set of packet streams, and determining, with reference to application layer data associated with each stream if the stream encodes a file-transfer operation, as is well-known in the art. Once it has been determined that a packet stream encodes a packet-transfer operation, threat analyzer application 45 can examine a file extension associated with that operation, and if the file extension encodes the proper type of file (e.g., ".exe" or ".dll" for Windows executables), regarding it as the proper type of file and regenerating the file from the packet stream. Threat analyzer application 45 can also use other techniques to assess the type of the file, such as examining the internal structure or contents of the file for elements that are indicative of the proper file type.

In sub-step 214, threat analyzer application 45 (e.g., running on threat analyzer device 44) performs file analysis on the extracted set of executable files 80, assigning a suspicion score (e.g., threat score 82) to each of the files 80 based on a set of heuristic functions associated with malware. This analysis need not be performed in real-time. Since a large number of files are expected to traverse network 32 in any given day, it may not be possible to analyze each one as it traverses. However, since typical networks experience time-varying traffic (e.g., traffic is higher between 8am and 9 pm than between 9 pm and 8 am), analysis of each file can be performed sequentially, even if that causes certain files to be analyzed hours after traversing the network 32.

The analysis may rely on a variety of heuristic algorithms for identifying malware suspicion. For example, traditional signature-based detection may be used to detect known malware.

In addition, all or some executable files 80 may be sandboxed to detect suspicious activity caused by operating that file. A sandbox is a protected virtual execution environment in which the file can be safely executed without causing damage to other applications running on the device. The protected virtual execution environment may be provided by a system virtual machine running on threat analyzer device 44. As is well-known in the art, a system virtual machine is a piece of application software that runs on a computer that provides a virtual execution environment mimicking an environment of a typical computerized device, such as by providing an operating system and virtual processor and memory resource. The sandbox may also provide mimicked access to accessories such as UI devices. Threat analyzer application 45 may analyze the state of the sandbox after executing the sandboxed file, and determine if the state is consistent with behavior associated with malware, typically by looking for damage or other changes to the system state typically caused by malware.

In addition, other heuristic algorithms may also be used, such as examining the network context of an executable file 80. This may be done by threat analyzer application 45 examining application layer data associated with the stream which encoded the file-transfer operation via which the executable file 80 was extracted and comparing it to application-layer data that would be expected from malware.

The various heuristic techniques can be combined to yield a composite threat score 82 that encodes a probability that the executable file 80 is malware as well as the relative damage that such malware would be expected to cause.

Once the threat score 82 has been computed, threat analyzer application 45 can store it in file DB 46 in connection with the associated file 80.

In sub-step 216, extraction application 50 (e.g., running on staging device 48) places the executable files 80 whose associated threat scores 82 exceed a predetermined threshold score value 89 into staging directory 52. For example, threshold score value 89 may be 80%, in which case, every executable file 80 whose associated threat score 82 exceeds 80% would be copied onto storage 90 and logically placed (within a directory structure of storage 90) within staging directory 52 as the set of extracted files 92, the set of extracted files 92 being suspected malware. In some embodiments, extraction application 50 runs on a periodic scheduled basis, for example daily at 11 pm.

In step 220, fingerprinting application 56 (e.g., running on search device 54), derives a distinctive signature based on the contents of the suspect file. This may be done according to various techniques. In some embodiments, fingerprinting application 56 applies a fingerprinting algorithm, which maps an arbitrarily large computer file to a much shorter bit string, its fingerprint, which uniquely identifies the computer file for all practical purposes. The algorithm should satisfy a condition of virtual uniqueness given an expected number of executable files, typically on the order of billions. The fingerprinting algorithm may be, for example, a cryptographic hash function or the well-known Rabin's fingerprinting algorithm. In other embodiments, other kinds of signatures may be generated.

In some embodiments, the fingerprinting algorithm, when applied to two different files having similar contents, yields similar fingerprints, the degree of similarity indicating a probabilistic degree of difference between the two files. This kind of fingerprinting algorithm may be referred to as a distance-enabled fingerprinting algorithm.

In some embodiments, the fingerprinting application 56 runs on a periodic scheduled basis, for example daily at midnight.

In optional step 230, policy creation application 110 (e.g., running on search device 54), establishes a policy 118 for the suspect file.

In some embodiments, policy 118 is an indication of the periodic frequency according to which the file 80 should be searched for based on the threat score 82 associated therewith. Typically, higher threat scores 82 will generate policies 118 with shorter periods. For example, if an executable file 80(a) has an associated threat score 82(a) of 85%, policy creation application 110 may store a policy 118 indicating that the fingerprint 116(1) associated with that executable file 80(a) should be scanned for every 24 hours, while if an executable file 80(b) has an associated threat score 82 of 95%, policy creation application 110 may store a policy 118 indicating that the fingerprint 116(2) associated with that executable file 80(b) should be scanned for every 8 hours.

In other embodiments, policy 118 is a grouping of the files 80 into classes, typically by binning into threat score 82 ranges. For example, a user may pre-define a set of classes corresponding to threat scores in the following ranges: I: 80-85%, II: 85-90%, III: 90-95%, and IV: 95-100%. Then, if an executable file 80(a) has an associated threat score 82(a) of 84%, policy creation application 110 set a policy 118 to group I, while if an executable file 80(b) has an associated threat score 82 of 96%, policy creation application 110 may 110 set a policy 118 to group IV. The user can program search director application 58 to search for fingerprints 116 within each group at pre-defined intervals, such as, for example, 24 hours for group I, 16 hours for group II, 12 hours for group III, and 8 hours for group IV. In other embodiments, policy 118 is an indication of a threshold value to be used by search agent 60 in assessing whether any given file 62, 138 is a close enough match using distance-enabled fingerprinting with respect to the associated fingerprint 116. Typically, higher threat scores 82 will generate policies 118 with longer threshold distances. For example, if an executable file 80(a) has an associated threat score 82(a) of 85%, policy creation application 110 may store a policy 118 indicating that the fingerprint 116(1) should be associated with a threshold distance of 10 units of distance, while if an executable file 80(b) has an associated threat score 82(b) of 95%, policy creation application 110 may store a policy 118 indicating that the fingerprint 116(2) should be associated with a threshold distance of 50 units of distance. Thus, executable files 80 with high associated threat scores 82 will match with files 62, 138 that are less close matches.

In step 240, search director application 58 (e.g., running on search device 54) causes a computerized device 38 to be scanned for the fingerprint 116 to detect whether the associated executable file 80 is present on the computerized device 38.

In some embodiments, depicted as sub-step 242, a search agent 60 running directly on search device 54 scans files 62 for the fingerprint 116. This can be done when the files 62 to be scanned are on the search device 54 itself. Put another way, this happens when the functionality of a search device 54 and a computing device 38 are combined into one machine. In such embodiments, search director application 58 scans files 124 within storage 108 of the search device 54 itself to detect which, if any, of the files 124 have a fingerprint matching any fingerprints 116 stored in the fingerprint DB 116.

In other embodiments, depicted as sub-step 244, search director application 58 (e.g., running on search device 54) sends a command to a search agent 60 running on a remote computing device 38, directing the search agent 60 to search for fingerprints 116 matched by files 62, 138 on the computing device 38.

Taking the embodiments of sub-step 244 as an example for descriptive purposes, there are several ways that the scanning can be done. In some embodiments, the fingerprinting algorithm is applied to files 62, 138, and the resulting fingerprints are directly compared to fingerprints 116. If the calculated fingerprint for any file 62, 138 is identical to any of the fingerprints 116, then that file 62, 138 is flagged as being malware.

(A) In some of these embodiments, this direct comparison is done on a scheduled periodic basis according to a standardized period. For example, search agent 60 scans all files 62 stored within storage 136 of computing device 38 for direct matches with fingerprints 116 once per day, at 1am.

(B) In other of these embodiments, this direct comparison is done on loaded files 138 whenever they are first loaded into memory 134. For example, search agent 60 scans a first file 138(i) for a direct match with fingerprints 116 upon that file 138(i) first being loaded, and then search agent 60 scans a second file 138(ii) for a direct match with fingerprints 116 upon that second file 138(ii) first being loaded, at a later time than the first file 138(i).

(C) In yet other of these embodiments, the direct comparison for each fingerprint 116 is done on a scheduled periodic basis that varies based on the policy 118 associated with that fingerprint 116. For example, search agent 60 will scan all files 62 on storage 136 for a direct match with a first fingerprint 116(1) every 24 hours if the policy 118(1) associated with that first fingerprint 116 (1) indicates 24 hours, while search agent 60 will scan all files 62 on storage 136 for a direct match with a second fingerprint 116(2) every 8 hours if the policy 118(2) associated with that second fingerprint 116(2) indicates 8 hours. Thus, based on the differing policies 118, search agent 60 will attempt to match the second fingerprint 116(2) three times as often as the first fingerprint 116(1).

In some embodiments (e.g., when distance-enabled fingerprinting is used), the fingerprinting algorithm is applied to files 62, 138, and the resulting fingerprints are compared to fingerprints 116. If the calculated fingerprint for any file 62, 138 is within a threshold distance to any of the fingerprints 116, then that file 62, 138 is flagged as being malware.

(A) In some of these embodiments, this distance-based comparison is done on a scheduled periodic basis with a standardized threshold distance. For example, search agent 60 scans all files 62 stored within storage 136 of computing device 38 for distance-based matches (having a distance less than the standardized threshold distance) with fingerprints 116 once per day, at 1am.

(B) In other of these embodiments, this distance-based comparison is done on loaded files 138 whenever they are first loaded into memory 134 with a standardized threshold distance. For example, search agent 60 scans a first file 138(i) for a distance-based match (having a distance less than standardized threshold distance) with fingerprints 116 upon that file 138(i) first being loaded, and then search agent 60 scans a second file 138(ii) for a distance-based match (having a distance less than standardized threshold distance) with fingerprints 116 upon that second file 138(ii) first being loaded, at a later time than the first file 138(i).

(C) In other of these embodiments, the distance-based comparison for each fingerprint 116 is done either on files 62 on a scheduled periodic basis or on loaded files 138 whenever they are first loaded into memory 134. In either case, the distance-based comparison uses a threshold distance defined separately for each fingerprint 116 based on the policy 118. For example, search agent 60 will scan all files 62 on storage 136 for a distance-based match with a first fingerprint 116(1) using the threshold distance defined by the policy 118(1) associated with that first fingerprint 116(1), while search agent 60 will scan all files 62 on storage 136 for a distance-based match with a second fingerprint 116(2) using the threshold distance defined by the policy 118(2) associated with that second fingerprint 116(2).

In optional step 250, management application 112 (e.g., running on search device 54) takes remedial action based on the search results 120.

In one embodiment, depicted as sub-step 252, management application 112 (e.g., running on search device 54) provides feedback to the threat analyzer application 45 to allow the threat analyzer application 45 to revise the threat score 82(m) associated with any executable file 80(m) whose associated fingerprint 116(q) was successfully matched with a file 62(p) on a computing device 38. Thus, for example, if a large number of files 62(p) on a variety of computing devices 38 matched a particular fingerprint 116(q), that fact may be evidence that that the executable file 80(m) associated with fingerprint 116(q) is a particularly virile form of malware capable of spreading very fast. In that case, it would be appropriate for threat analyzer application 45 to raise the threat score 82(m) associated with that executable file 80(m).

In another embodiment, depicted as sub-step 254, management application 112 (e.g., running on search device 54) may (A) delete a file 62(p) that is flagged as being malware or (B) move the file 62(p) from storage 136 and copying it to the flagged file storage area 122 or (C) quarantine the file 62(p) by encrypting it or removing its access privileges or (D) send an alert to a system administrator via UI 242 indicating that the file 62(p) is potential malware so that the system administrator can take appropriate remedial action. In some embodiments, which one (or more) of steps (A), (B), (C), or (D) is taken may depend on how management application 112 is configured. In other embodiments, which one (or more) of steps (A), (B), (C), or (D) is taken may depend on the policy 118(q) associated with the fingerprint 116(q) that was matched in the file 62(q) and/or the distance between the fingerprint 116(q) and the calculated fingerprint of the file 62(q).

Thus embodiments have been provided for analyzing network traffic to detect suspected malware, such as zero-day malware, traversing a network and then automatically also detecting similar suspected malware already installed on computing devices of the network.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, computer programs embodying these methods may also be included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded or are impossible.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of detecting malware, the method comprising:
   from a database of historic network traffic, identifying a suspect file that traveled through a network as being suspected malware;
   deriving a distinctive signature based on contents of the suspect file; and
   scanning a computerized device of the network for the distinctive signature to detect whether the suspect file is present on the computerized device, wherein scanning the computerized device of the network for the distinctive signature to detect whether the suspect file is present on the computerized device includes scanning the computerized device of the network for the distinctive signature to detect whether the suspect file is stored within persistent storage of the computerized device;
   wherein identifying the suspect file includes:
   performing file extraction on the database, the database storing packets captured from the network, to extract from the captured packets a set of executable files traversing the network;
   performing file analysis on the set of executable files, assigning a suspicion score to each of the executable files based on a set of heuristic functions associated with malware; and
   placing executable files whose suspicion score exceeds a predetermined threshold score in a staging directory by, on a scheduled periodic basis, for each executable file of the set of executable files:

comparing the suspicion score associated with that executable file to the predetermined threshold score; and
if and only if the suspicion score associated with that executable file exceeds the predetermined threshold score, copying that executable file to the staging directory.

2. The method of claim 1 wherein deriving the distinctive signature based on the contents of the suspect file includes:
applying a fingerprinting hash function to each of the executable files in the staging directory to generate a set of fingerprints, the fingerprinting hash function satisfying a condition of virtual uniqueness given an expected number of executable files.

3. The method of claim 2 wherein:
the fingerprinting hash function, when applied to two different files having similar contents, yields similar fingerprints; and
scanning for the distinctive signature to detect whether the suspect file is present on the computerized device includes:
applying the fingerprinting hash function to files present on the computerized device to yield a test fingerprint for each file; and
generating an affirmative result if and only if a file present on the computerized device has a test fingerprint that is similar to a fingerprint of the set of fingerprints, the similarity indicating a difference between the file and an executable file of the set of executable files of less than a threshold degree.

4. The method of claim 2 wherein the method further includes establishing a scan policy for the suspect file, wherein establishing the scan policy for the suspect file includes:
setting the threshold degree based on the suspicion score of the suspect file, such that a higher suspicion score yields a higher threshold degree, and a lower suspicion score yields a lower threshold degree.

5. The method of claim 3 wherein the method further includes:
if the suspect file is present on the computerized device, then increasing the suspicion score for that suspect file by an amount in relation to the similarity.

6. The method of claim 2 wherein:
the fingerprinting hash function, when applied to two files having the same contents, yields the same fingerprint; and
scanning for the distinctive signature to detect whether the suspect file is present on the computerized device includes:
applying the fingerprinting hash function to files present on the computerized device to yield a test fingerprint for each file; and
generating an affirmative result if and only if a file present on the computerized device has a test fingerprint that matches a fingerprint of the set of fingerprints.

7. The method of claim 2 wherein applying the fingerprinting hash function to each of the executable files in the staging directory is performed on a periodic schedule.

8. The method of claim 1 wherein:
performing the file analysis is performed by a first application running on a first machine; and
applying the fingerprinting hash function to each of the executable files is performed by a second application running on a second machine, the first and second applications being different and the first and second machines being different.

9. The method of claim 8 wherein:
the computerized device is the second machine; and
scanning the computerized device of the network for the distinctive signature to detect whether the suspect file is present on the computerized device includes the second application causing the second machine to locally search for the suspect file.

10. The method of claim 8 wherein:
the computerized device is a third machine different from the first machine and the second machine; and
scanning the computerized device of the network for the distinctive signature to detect whether the suspect file is present on the computerized device includes:
the second application causing the second machine to send the set of fingerprints to a third application running on the third machine, the third application being different from the first and second applications;
the third application causing the third machine to locally search for the suspect file running; and
the third application causing the third machine to send search results back to the second application on the second machine.

11. The method of claim 1 wherein scanning the computerized device of the network for the distinctive signature to detect whether the suspect file is present on the computerized device includes searching data storage of the computerized device for the suspect file at scheduled periodic intervals.

12. The method of claim 11 wherein searching data storage of the computerized device for the suspect file at scheduled periodic intervals includes setting a period length of the periodic intervals based on the suspicion score of the suspect file, such that a higher suspicion score yields a shorter period length, and a lower suspicion score yields a longer period length.

13. The method of claim 11 wherein searching data storage of the computerized device for the suspect file at scheduled periodic intervals further includes searching all files loaded into system memory of the computerized device as they are loaded into system memory during normal operation of the computerized device.

14. The method of claim 1 wherein searching data storage of the computerized device for the suspect file at scheduled periodic intervals includes searching all files loaded into system memory of the computerized device as they are loaded into system memory during normal operation of the computerized device.

15. The method of claim 1 wherein the method further includes performing a remedial action in response to detecting presence of the suspect file on the computerized device, the remedial action including an action drawn from the set of:
deleting the suspect file from the computerized device;
moving the suspect file to a flagged file storage area;
quarantining the suspect file found on the computerized device; and
alerting a system administrator that the suspect file has been found on the computerized device.

16. The method of claim 1 wherein assigning the suspicion score to each of the executable files based on the set of heuristic functions associated with malware includes, on a network server, for each executable file:
executing that executable file within a protected sandbox operating on the network server, the protected sandbox mimicking an environment of a typical computerized device, to detect behavior within the protected sandbox associated with malware; and assigning the suspicion score to that executable files based on:
whether a network context of that executable file is associated with a network context associated with malware; and
whether behavior associated with malware is detected within the protected sandbox while executing that executable file.

17. A system of detecting malware, comprising:
a communications interface constructed and arranged to communicate with a computerized device;
a database constructed and arranged to store historic network traffic;
control circuitry coupled to the communications interface and the database, the control circuitry being constructed and arranged to:
from the database of historic network traffic, identify a suspect file that traveled through a network as being suspected malware,
derive a distinctive signature based on contents of the suspect file; and
communicate with the computerized device, via the communications interface, to scan the computerized device for the distinctive signature to detect whether the suspect file is present on the computerized device, wherein scanning the computerized device for the distinctive signature to detect whether the suspect file is present on the computerized device includes scanning the computerized device for the distinctive signature to detect whether the suspect file is stored within persistent storage of the computerized device;
wherein identifying the suspect file includes:
performing file extraction on the database, the database storing packets captured from the network, to extract from the captured packets a set of executable files traversing the network;
performing file analysis on the set of executable files, assigning a suspicion score to each of the executable files based on a set of heuristic functions associated with malware; and
placing executable files whose suspicion score exceeds a predetermined threshold score in a staging directory by, on a scheduled periodic basis, for each executable file of the set of executable files:
comparing the suspicion score associated with that executable file to the predetermined threshold score; and
if and only if the suspicion score associated with that executable file exceeds the predetermined threshold score, copying that executable file to the staging directory.

18. A computer program product comprising a non-transitory computer-readable storage medium storing instructions, which, when executed by a computer, cause the computer to:
from a database of historic network traffic, identify a suspect file that traveled through a network as being suspected malware;
derive a distinctive signature based on contents of the suspect file; and
communicate with a computerized device to scan the computerized device for the distinctive signature to detect whether the suspect file is present on the computerized device, wherein scanning the computerized device for the distinctive signature to detect whether the suspect file is present on the computerized device includes scanning the computerized device for the distinctive signature to detect whether the suspect file is stored within persistent storage of the computerized device;
wherein identifying the suspect file includes:
performing file extraction on the database, the database storing packets captured from the network, to extract from the captured packets a set of executable files traversing the network;
performing file analysis on the set of executable files, assigning a suspicion score to each of the executable files based on a set of heuristic functions associated with malware; and
placing executable files whose suspicion score exceeds a predetermined threshold score in a staging directory by, on a scheduled periodic basis, for each executable file of the set of executable files:
comparing the suspicion score associated with that executable file to the predetermined threshold score; and
if and only if the suspicion score associated with that executable file exceeds the predetermined threshold score, copying that executable file to the staging directory.

* * * * *